May 7, 1968  AL WEINER  3,382,316

ALTERNATOR RECTIFIER PLATE HARNESS

Filed May 10, 1967  2 Sheets-Sheet 1

INVENTOR
Al Weiner

ATTORNEYS

May 7, 1968 AL WEINER 3,382,316
ALTERNATOR RECTIFIER PLATE HARNESS
Filed May 10, 1967 2 Sheets-Sheet 2
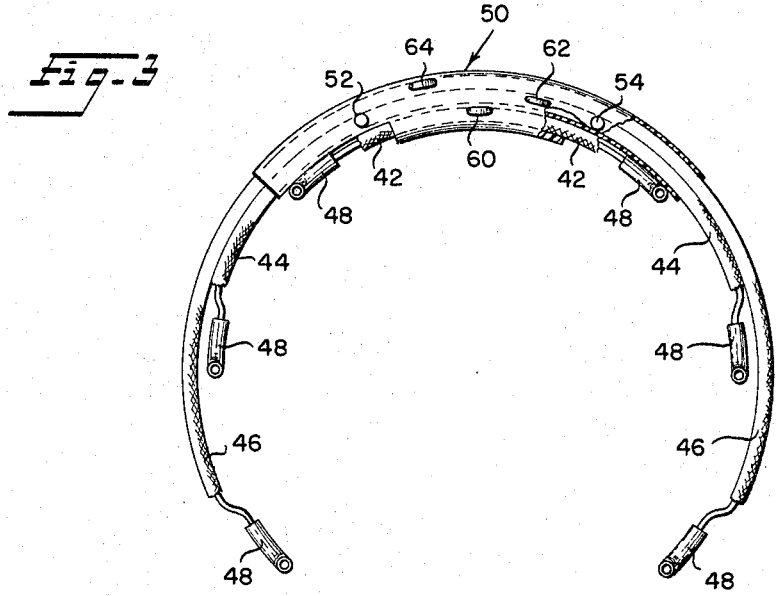
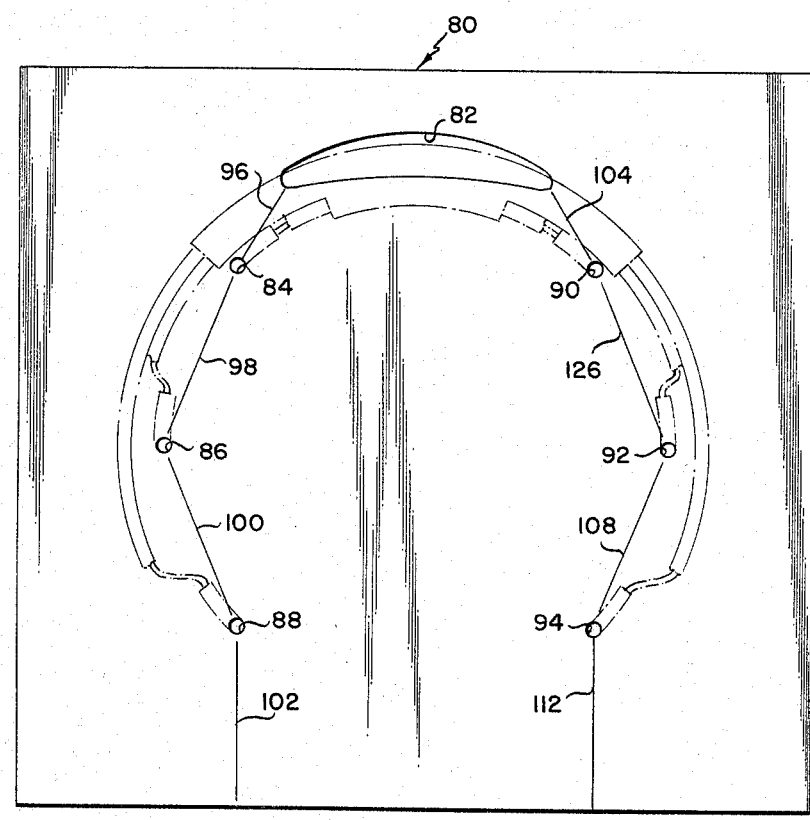
INVENTOR
*Al Weiner*
ATTORNEYS

United States Patent Office 3,382,316
Patented May 7, 1968

3,382,316
ALTERNATOR RECTIFIER PLATE HARNESS
Al Weiner, 2111 Regatta Ave.,
Miami Beach, Fla. 33139
Filed May 10, 1967, Ser. No. 637,513
8 Claims. (Cl. 174—72)

ABSTRACT OF THE DISCLOSURE

A three-phase alternator, as used in automobiles, having a pair of rectifier plates with three diode units on each plate, one for each phase, are connected by an electrical harness of three rigid diode current conductors. The conductors are made of heavy gauge wire with terminal wire engaging members at the ends thereof and output lead engaging portions of U-shape formed from the central portion thereof. The three diode current conductors are arcuately shaped and have a common central section which is encased in a rigid plastic of sufficient rigidity to support and provide a bridge between the separate rectifier plates so that they can be handled as one integral unit with the electrical harness.

---

This invention relates to an electrical conducting assembly for the rectifier plates of an electrical alternator.

Background of the invention

Three-phase alternators as used by several automotive manufacturers have had a high percentage of failures of the alternator rectifier assembly diode current conductor units.

These units are circular shaped plastic sheets open at one end which are as wide as the diode rectifier plates of the alternator assembly. Three diode conductor strips are embedded on the sheet and connect the three sets of diodes for the three-phase alternator.

These current conducting units have been failing, apparently from overheating, and the invention is directed towards solving this problem, and also to making it possible to more easily replace diode elements of the rectifier assembly that have failed.

Objects of the invention

Accordingly, it is the principal object of this invention to provide a new type of diode current conductor unit which is less susceptible to failure than the previous type of diode current conductor units.

There is another object of this invention to make it possible to more easily repair alternator rectifier plate assemblies which have failed.

It is a still further object of this invention to provide a diode current conductor unit which is more economical to manufacture and to install in an alternator rectifier plate assembly.

It is a still further object of this invention to provide an electrical diode current conducting harness which permits greater air cooling circulation over the rectifier plates, to reduce incidence of failure due to overheating.

It is a still further object of this invention to provide the rectifier plate electrical harness for a three-phase alternator which has much greater current capacity and structural durability than the presently used heat type of diode current conductors, to thereby reduce the possibility of failure of the unit.

A still further object of this invention is to provide an alternator rectifier plate electrical harness which can be installed in an alternator rectifier assembly in substantially less time than the currently used sheet type diode current conductor units.

A still further object of this invention is to provide an alternator rectifier plate electrical harness which can be directly installed on the rectifier plates without requiring special jigs, and does not require soldering of the harness leads to the diode terminals.

Another object of this invention is to provide a method of quickly assembling a diode current conductor assembly to alternator rectifier plates.

These and further objects of this invention will become apparent from the following description and claims.

Description of the drawings:

FIGURE 3 is a bottom view of the rectifier plate electrical harness of the subject invention.

FIGURE 5 shows a card on which the rectifier plate electrical harness is mounted to facilitate its installation on the alternator rectifier plates.

Referring particularly to the drawings, FIGURE 1 shows the end cap 10 for an alternator as used in an automobile having a central backface 12 and an outer circular peripheral flange 14. A central opening 16 for the rotor shaft, and a circular upstanding annular flange 18 is also shown.

Figure 1:
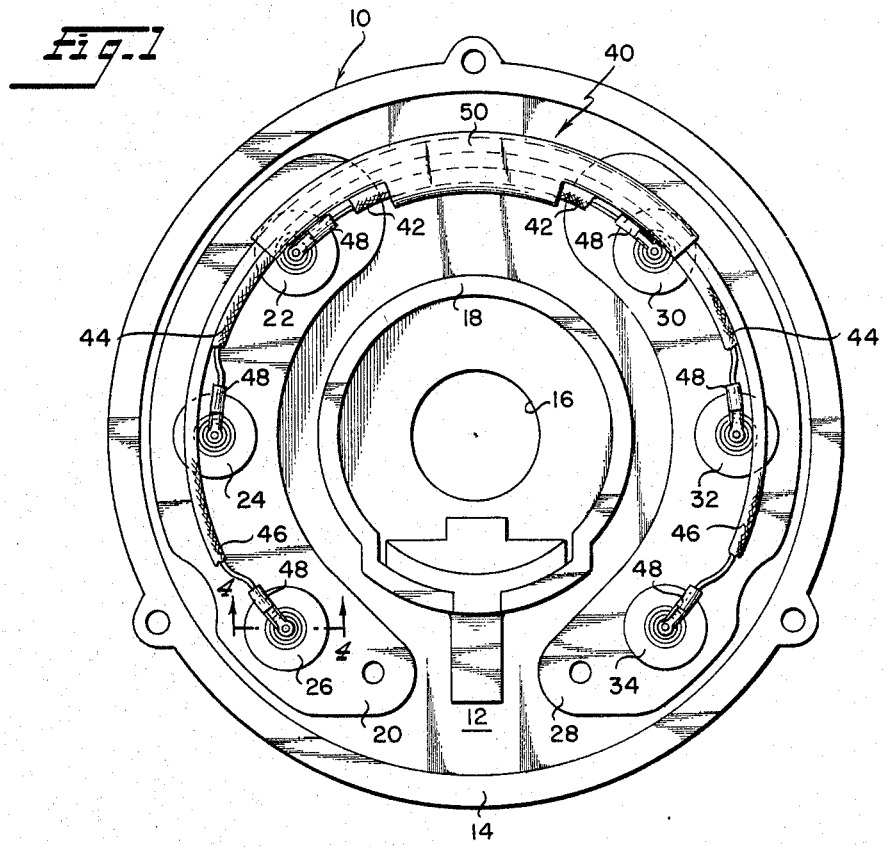
FIGURE 1 is a top view of an alternator plate showing a rectifier plate assembly with the electrical harness of the subject invention in position.

A diode rectifier plate 20 made of metal is mounted on the backface 12 of the alternator end cap 10. It supports diodes 22, 24 and 26 which are soldered thereto. These are standard diode units which rectify the output from each of the three phases of the alternator.

Similarly rectifier plate 28 has three diode units 30, 32 and 34.

The diodes on the rectifier plates 20 and 28 are connected by an electrical harness generally indicated at 40 which has three arcuately shaped diode current conductors 42, 44 and 46 which connect the corresponding diodes of each of the three phases of the alternator.

The inner diode current conductor 42 connects diodes 22 and 30. The central diode current conductor 44 connects diodes 24 and 32, while the outer and longest diode current conductor connects diodes 26 and 34.

The diode current conductors 42, 44 and 46 are preferably made of 14 gauge cold drawn tinned wire which provides excellent conductivity for current passing through the conductors and is also of sufficient rigidity to prevent vibration of the harness.

A special connector generally indicated at 48 is attached to the ends of all of the diode current conductors. A circular rigid piece of material, preferably plastic encases the common central section of the three diode current conductors to hold them rigidly in position and to provide a support bridge between the rectifier plates 20 and 28 so that the harness and the two plates form a rigid unitary piece.

Figure 2:
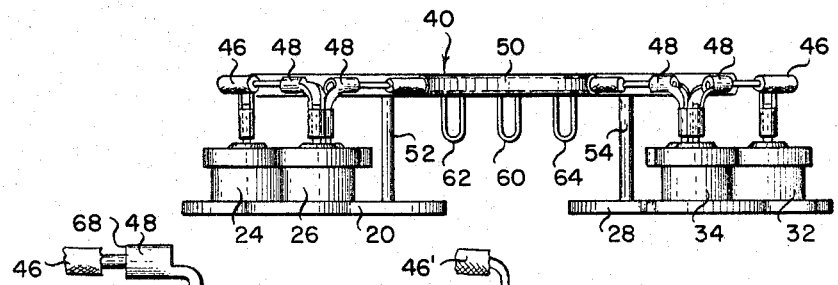
FIGURE 2 is a front elevational view of the rectifier plate assembly shown in FIGURE 1.

FIGURE 2 shows the harness in position and shows the spacer support pieces 52 and 54 which hold the electrical harness 40 in correct spaced position from the rectifier plates 20 and 28.

Each of the diode current conducting units, as seen in FIGURES 2 and 3, have a depending U-shaped output terminal member which is formed from the heavy gauge wire used in each of the conductors. The short inner diode current conductor 42 has a depending U-shaped output terminal 60, which extends out through the circular casing 50. Similarly, the central diode current conductor 44 has depending output terminal 62, and the outer diode current conductor 46 has the depending U-shaped output terminal 64.

The output lead for the first phase current passing through diode current conductor 42 is passed through loop 60 which is then crimped down on it and the connection soldered. Similar connections are made for the other two phases to output terminals 62 and 64.

Each of the diode current conducting units have insulation thereon, and preferably an insulating sleeve covering the whole wire between the terminal connectors and the depending U-shaped crimped terminal connectors are used. However, the conventional insulated wire could be used instead of the drawn tinned conductors.

Figure 4:
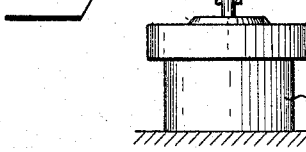
FIGURE 4 is a view taken along the line 4—4 of FIGURE 1 showing in detail the terminal type connection to the output terminal of a diode on the alternator rectifier plate.

Referring to FIGURE 4, it will be seen that the terminal connectors at the end of each of the diode current conductors have a circular member 68 fixedly engaged on the end of the conductor and has a matching circular sleeve section 70 which fits around and engages the upstanding wire terminal 72 of the diode. This construction is similar for all of the connector and diodes shown. The connection between the terminal 72 and the sleeve 70 is made by simply crimping the sleeve 70 after the harness is installed on the diode wire terminals.

Figure 4A:
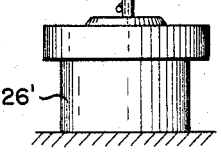
FIGURE 4A shows another type of terminal connection arrangement using a "pigtail" of wire.

FIGURE 4A shows a "pigtail" connection, when the end of the conductor wire is twisted into a loop or "pigtail" 70' which is crimped to diode terminal wire 72'.

Referring to FIGURE 5 a card 80 is shown on which the wire harness is mounted. The outline of the electrical harness 40 is shown in phantom in the figure. The central opening 82 accommodates the spacer studs 52 and 54 as well as the depending U-shaped terminals 60, 62 and 64 of the electrical harness. These members pass through the opening so that the harness fits flat against the card.

The opening 84 receives the sleeve portions 70 of the connector 48 mounted on the left hand end of inner diode current conductor 42. Similarly, holes 86 and 88 respectively receive the sleeves 70 of the connectors 48 attached to the left hand ends of diode current conductors 44 and 46. The corresponding terminals 48 of the right ends of diode current conductors 42, 44 and 46 are respectively mounted in holes 90, 92 and 94 in the card 80.

Score lines 96, 98 and 100 respectively connect the openings 82, 84, 86 and 88. Score line 102 connects the hole 88 with the lower edge of the card. Score lines 104, 106 and 108 respectively connect holes 82, 90, 92 and 94 and score line 100 connects the hole 94 with the lower right hand edge of the card.

The harness and card assembly are simply mounted on the diode rectifier plates, connections made, and then the scored harness support card is torn away from the rectifier and harness assembly, by tearing the card along the score lines.

This arrangement has a distinct advantage over the prior art circular laminate with copper conductors thereon, in that the electrical harness does not present a baffle, cutting off cooling air flow to the rectifier diode plates.

In the preferred construction of the rectifier plate electrical harness, Class F 155 degree solid drawn Number 14 tinned wire is used for the three diode current conductors. Insulating sleeve material is used over the wire.

The conductors are shaped, terminals crimped to the ends thereof, and then the three wires are placed in a mold for aiding the central rigid casing material of nylon or other thermo-setting plastic.

This arrangement provides about 80 percent greater conductor area than the presently used conductors on the thin circular shaped diode current units.

One of the big advantages of the invention is that it can readily be assembled in only a fraction of the time required to install the sheet type of unit. The terminals at the ends of the electrical harness are quickly placed over the diode terminal wires and then simply crimped in place, instead of requiring the soldering of the old type unit. The support lugs of the electrical harness eliminate the need for special insulator support pieces used with the sheet type unit, and the depending U-shaped pieces permit quick installation of output leads and soldering thereof without the draw-back of possibly loosening terminal pieces. This is a problem with the sheet type conducting units which has terminal studs soldered to the sheet which often come loose when output leads are soldered to them.

The installation time for the electrical harness of the subject invention is approximately one-third that of the sheet type conducting unit. The assembled rectifier assembly with the electrical harness is much more durable and reliable, and the material cost is considerably less.

While there has been herein shown and described a preferred embodiment of the invention, it is nevertheless to be understood that various changes may be made therein, without departing from the scope of the claims hereto appended.

What I claim is:

1. A rectifier plate electrical harness for a three-phase alternator, comprising:
 (a) three concentrically disposed arcuately shaped diode current conductor wires of different length which have a central common arc of approximately 90 degrees and are symmetrical about a center line passing transversely through said common arc;
 (b) the outer, central, and inner diode current conducting wires each enclosing a different arc length, said arc lengths being of approximately 270, 180, and 90 degrees;
 (c) terminal wire engaging means integral with the ends of each said conducting wires for connecting to a terminal wire of a diode on an alternator rectifier plate;
 (d) said diode current conductor wires being heavy gauge wire which is relatively rigid;
 (e) output lead terminal engaging means formed from a part of a central arc of each of said diode current conducting wires;
 (f) rigid encasing and support means covering all three of said diode current conducting wires along the said common central arc to hold said wires together and to provide a rigid central section.

2. A rectifier plate electrical harness for a three-phase alternator as set forth in claim 1, wherein:
 (a) said terminal wire engaging means is a connected terminal member having a cylindrical member for engaging said terminal wire of the diode.

3. A rectifier plate electrical harness as set forth in claim 1, wherein:
 (a) said output lead terminal engaging means is a depending U-shaped section of wire.

4. A rectifier plate electrical harness for a three-phase alternator as set forth in claim 1, wherein:
 (a) said rigid encasing and support means is a covering of stiff thermosetting plastic material.

5. A rectifier plate electrical harness for a three-phase alternator as set forth in claim 1, wherein:
 (a) said diode current conducting wires are heavy gauge tinned copper.

6. A rectifier plate electrical harness for a three-phase alternator as set forth in claim 1, wherein:
 (a) said rigid encasing and support means covering said diode current conducting wires has a plurality of stud members which extend outwardly therefrom for engaging said alternator rectifier plate.

7. A rectifier plate electrical harness assembly for a three-phase alternator, comprising:
 (a) three concentrically disposed arcuately shaped diode current conductor wires of different length which have a common arc of approximately 90 degrees and are symmetrically disposed about a center line passing transversely through said common arc;
 (b) terminal wire engaging means integral with the ends of each of said conducting wires for mechanically connecting it to a terminal wire of a diode on an alternator rectifier plate;
(c) said diode current conducting wires being heavy gauge wire which is relatively rigid;
(d) depending output lead terminal engaging means extending downwardly in the direction transverse of the plane in which said diode current conducting wires are disposed;
(e) rigid encasing and supporting means covering the central arc portion of all three of said diode current conducting wires;
(f) a mounting card having a plurality of terminal receiving holes on which said three concentrically disposed arcuately shaped diode conducting wires are mounted, the terminal wire engaging means extending through said holes and being held fixedly in position therein; and
(g) score lines in said card joining adjacent holes and the outer edge of said mounting card, so that terminal wire engaging means can be readily connected to the alternator rectifier plates of the alternator without requiring alignment, and the card subsequently torn along the score lines to remove it from the alternator rectifier assembly.

8. A rectifier plate electrical harness as set forth in claim 1, wherein:
(a) said terminal wire engaging means is an integral "pigtail" of wire at the free ends of each of said diode current conducting wires.

References Cited

UNITED STATES PATENTS

| | | |
|---|---|---|
| 907,852 | 12/1908 | Munyan. |
| 1,471,834 | 10/1923 | Defibaugh. |
| 1,574,297 | 2/1926 | Lilleberg. |
| 2,134,946 | 11/1938 | Hurley _____ 174—72 X |
| 2,399,753 | 5/1946 | McLarn. |
| 3,128,214 | 4/1964 | Lay. |
| 3,145,317 | 8/1964 | Blohm et al. |
| 3,198,972 | 8/1965 | Larson. |
| 3,250,928 | 5/1966 | Bates _____ 310—68 |

FOREIGN PATENTS

| | | |
|---|---|---|
| 12,862 | 1901 | Great Britain. |
| 616,753 | 1/1949 | Great Britain. |

LARAMIE E. ASKIN, *Primary Examiner.*